Oct. 1, 1935.    G. A. RAGUIN    2,016,217

PRODUCTION OF CINEMATOGRAPHIC FILMS

Filed Sept. 26, 1934

INVENTOR:—
Georges André Raguin
By
ATTORNEYS.

Patented Oct. 1, 1935

2,016,217

UNITED STATES PATENT OFFICE 2,016,217

PRODUCTION OF CINEMATOGRAPHIC FILMS

Georges André Raguin, Lyon, France, assignor to "Societe Lumière", Paris, France, a joint-stock company of France Application September 26, 1934, Serial No. 745,644
In France October 18, 1933

16 Claims. (Cl. 88—24)

My invention relates to the production of cinematographic films in natural colours of the type wherein the sensitive surface is associated with a multi-colour reseau made up of very small coloured elements, generally in three colours.

It is actually easy in practice to obtain an original or master film by exposure in an appropriate camera. But difficulties are encountered when it is desired to reproduce such a film. The copy generally shows two defects: a dilution of the colours and the presence of a multitude of points, this latter defect being generally known as "granulation".

In my co-pending patent application Serial No. 745,643, filed September 26, 1934, I have disclosed a method whereby copies may be obtained with colours as brilliant as those of the master picture. For photographic transparencies other than cinematographic films, this method is sufficient because granulation is avoidable by printing from the master picture in such a way that the image on the copy is not quite sharp; but cinematographic films must bear images as sharp as possible and then granulation appears.

According to this invention granulation is avoided by printing from the master film by projection with reduction, (the amount of reduction being at least conversely proportional to the number of different colored grains of the reseau) the dimensions of the master film being thus greater than those of the standard cinematographic films.

Figure 1:
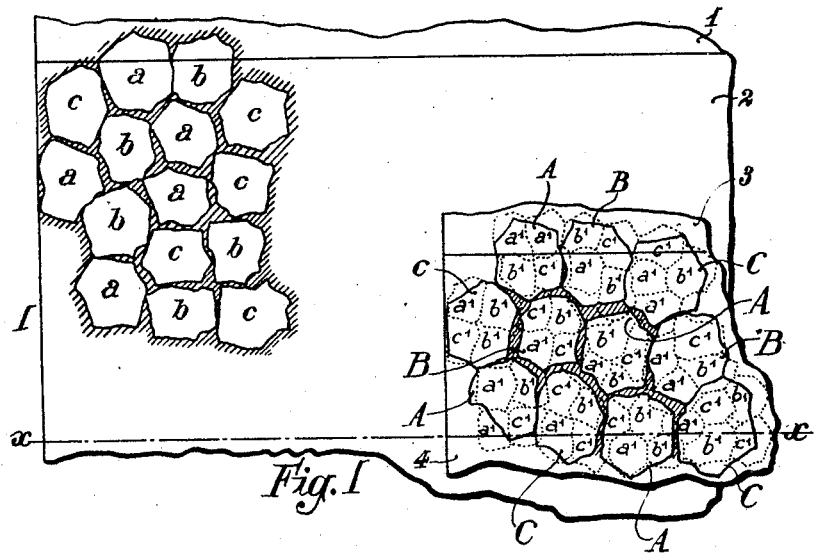
Fig. 1 shows a portion of the original or master film and the corresponding portion of the copy.

The film $I$ used as master film is greater in size than the film $3$ which has to be printed therefrom. In the example shown in Fig. 1 the master film is four times greater in surface than the copying film $3$. Thus if the latter has to bear pictures $4$ of the standard size of 18 x 24 millimeters, the master film must bear pictures $2$ of 36 x 48 millimeters. Line $x—x$ represents the middle horizontal axis of pictures $2$ and $4$.

The reseau of the master film $I$ is made up of very small elements in three colours, such as orange, green and violet. These elements are respectively shown at $a$, $b$, $c$ their sizes being of course greatly exaggerated. The copying film $3$ is provided with a similar reseau comprising elements A, B, C. These elements $a$, $b$, $c$ or A, B, C are in practice as small in size as possible.

The pictures, such as $2$, of the master film $I$ are projected on the copying film $3$ with an optical reduction of 4 to 1. The projecting apparatus is adjusted with care so as to obtain pictures $4$ as sharp as possible on the copy. Each element $a$, $b$, $c$ of the master reseau is thus itself distinctly printed on the copy at $a_1$, $b_1$, $c_1$, these images $a_1$, $b_1$, $c_1$ being four times smaller in size than the elements A, B, C of the copying reseau. On any of the latter elements, A for instance, there is practically always formed the image $a_1$ of an element $a$ of the same colour in the master reseau.

Suppose that the master film is positive and consider, for instance a portion of the master picture $2$ wherein the elements $a$ are very transparent.

When this picture is printed without reduction in size, as it is usual, some elements A of the copying reseau are not at all overlapped by the images $a_1$ of elements $a$ in the corresponding portion of picture $4$. These elements thus receive no light of a proper wave length to pass through them and they will appear as black in the positive copy. These black points cause the defect known as granulation. The sharper is the copy, the more marked is this defect.

But when the printing is effected with a reduction of at least one-third in area, the elements A of the copying reseau are practically always overlapped by the images $a_1$ of the corresponding elements $a$ of the master reseau and granulation is avoided even with the sharpest pictures.

Figures 2, 3:
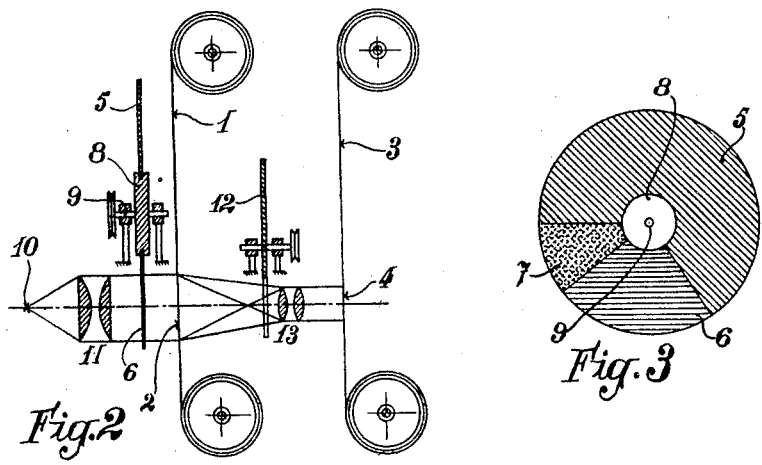
Fig. 2 is a diagrammatic cross section of the apparatus for carrying out the method of the invention.
Fig. 3 is a front view of the rotating filter screen.

In order to obtain on the copy colours as brilliant as those of the master film, the exposure is preferably effected in three monochromatic lights corresponding to the three primary colours of the reseau as disclosed in my aforesaid co-pending application Serial No. 745,643, filed September 26, 1934. This is obtained (Figs. 2 and 3) by means of a rotating disk 5—6—7 supported by a hub 8 with pin 9. This disk is made of a transparent material and it is divided in three sectors 5, 6, 7, each being coloured by means of a saturated monochromatic dye-stuff. Thus sector 5 is green, sector 6 violet and sector 7 orange. The angular proportions of the respective sectors are so selected that any predominant colour is avoided on the copy. This disk rotates at high speed which avoids the necessity of any synchronizing with the driving gear of the films 1 and 3. The arrangement also comprises the source of light 10, the condenser 11, the circular obturator 12 and the projecting lenses 13. Disk 5—6—7 could also be arranged in front of film 3.

It will be obvious that the invention may also be applied when the master film is negative, the defect of granulation being equally present in such a case.

The invention also applies when the reseau used has two or four colours.

I claim:

1. A method for the production of cinematographic films in natural colors consisting in printing with reduction from a master film having a multi-color grained reseau onto a copy film having a multi-color grained reseau associated with the sensitive surface in which the grains are of same average size and colors as in the master film reseau, the reduction being at least conversely proportional to the number of different colored grains so that there is always formed on each grain of the copy reseau the image of a grain of same color of the master film reseau.

2. In a method as set forth in claim 1, said printing being effected by means of a succession of monochromic lights corresponding with the primary colors of said reseau.

3. In a method as set forth in claim 1, the reduction being in the ratio of approximately 4 to 1.

4. In a method as set forth in claim 1, said grain elements of the reseaus being of size as small as possible.

5. A method for the production of cinematographic films in natural colors, consisting in passing in a camera a master film having a multi-color grained reseau; and in printing with reduction from said master film onto a copy film having a multi-color grained reseau associated with the sensitive surface in which the grains are of same average size and colors as in the master film reseau, the reduction being at least conversely proportional to the number of different colored grains so that there is always formed on each grain of the copy reseau the image of a grain of same color of the master film reseau.

6. In a method as set forth in claim 5, said printing being effected by means of a succession of monochromic lights corresponding with the primary colors of said reseau.

7. In a method as set forth in claim 5, the reduction being in the ratio of approximately 4 to 1.

8. In a method as set forth in claim 5, said grain elements of the reseaus being of size as small as possible.

9. A method for the production of cinematographic films in natural colors consisting in printing with reduction from said master film having a multi-color grained reseau, said master film being of a size greater than the size of the film to be finally produced onto a copy film having a multi-color grained reseau associated with the sensitive surface in which the grains are of the same average size and colors as in the master film reseau, the reduction being at least conversely proportional to the number of different colored grains so that there is always formed on each grain of the copy reseau the image of a grain of same color of the master film reseau.

10. In a method as set forth in claim 9, said printing being effected by means of a succession of monochromic lights corresponding with the primary colors of said reseau.

11. In a method as set forth in claim 9, the reduction being in the ratio of approximately 4 to 1.

12. In a method as set forth in claim 9 said grain elements of the reseaus being of size as small as possible.

13. A method for the production of cinematographic films in natural colors, consisting in passing in a camera a master film having a multi-color grained reseau, said master film being of a size greater than the size of the film to be finally produced; and in printing with reduction from said master film onto a copy film having a multi-color grained reseau associated with the sensitive surface in which the grains are of the same average size and colors as in the master film reseau, the reduction being at least conversely proportional to the number of different colored grains so that there is always formed on each grain of the copy reseau the image of a grain of same color of the master film reseau.

15. In a method as set forth in claim 13, the printing being effected by means of a succession of monochromic lights corresponding with the primary colors of said reseau.

14. In a method as set forth in claim 13, the reduction being in the ratio of approximately 4 to 1.

16. In a method as set forth in claim 13, said grain elements of the reseaus being of size as small as possible.

GEORGES ANDRE RAGUIN.